United States Patent
Tsuchida et al.

(10) Patent No.: US 11,558,235 B2
(45) Date of Patent: Jan. 17, 2023

(54) COMMUNICATION APPARATUS AND COMMUNICATION METHOD

(71) Applicant: TOSHIBA TEC KABUSHIKI KAISHA, Tokyo (JP)

(72) Inventors: Sunao Tsuchida, Mishima Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/529,469

(22) Filed: Nov. 18, 2021

(65) Prior Publication Data

US 2022/0247615 A1 Aug. 4, 2022

(30) Foreign Application Priority Data

Feb. 1, 2021 (JP) .............................. JP2021-014487

(51) Int. Cl.
*H04L 27/38* (2006.01)
*H04B 5/00* (2006.01)

(52) U.S. Cl.
CPC ........... *H04L 27/38* (2013.01); *H04B 5/0062* (2013.01)

(58) Field of Classification Search
CPC ................................ H04B 5/0062; H04L 27/38
See application file for complete search history.

(56) References Cited

U.S. PATENT DOCUMENTS

| 5,894,496 A | * | 4/1999 | Jones | ..................... H04B 7/084 330/109 |
| 6,996,164 B1 | * | 2/2006 | Blount | .................. H04L 27/368 455/284 |
| 7,020,216 B1 | * | 3/2006 | Lipp | ...................... H03F 1/3247 455/24 |
| 7,076,217 B1 | * | 7/2006 | Luff | ....................... H04B 1/403 455/313 |
| 7,340,226 B2 | * | 3/2008 | Ben-Ayun | ............... H04L 27/36 330/109 |
| 8,023,579 B2 | * | 9/2011 | Sano | .................... H04L 27/2273 455/41.3 |

(Continued)

FOREIGN PATENT DOCUMENTS

| JP | 2010-28740 | 2/2010 |
| JP | 2020-112987 | 7/2020 |

*Primary Examiner* — Jean B Corrielus
(74) *Attorney, Agent, or Firm* — Amin, Turocy & Watson, LLP

(57) ABSTRACT

A communication apparatus includes a generation unit that generates the first I signal and the first Q signal as signals that allow a carrier wave to undergo frequency shift keying with predetermined modulated data and inputs the first I signal and the first Q signal to a quadrature modulation unit. A first demodulation unit and the first decoding unit demodulate and decode first data that undergoes amplitude shift keying and is transmitted from the wireless tag. A second demodulation unit and the second decoding unit demodulate and decode second data that undergoes frequency shift keying from a wireless signal output from the wireless tag. A comparison unit compares the second data and the modulated data to each other. The processor executes, when matching between the second data and the modulated data is confirmed by the comparison unit, data processing on the first data.

17 Claims, 3 Drawing Sheets

(56) References Cited

U.S. PATENT DOCUMENTS

2008/0079557 A1* 4/2008 Alicot .................. H04B 5/02
                                                340/505
2008/0229178 A1   9/2008 Shimura

* cited by examiner

COMMUNICATION APPARATUS AND COMMUNICATION METHOD

CROSS-REFERENCE TO RELATED APPLICATION

This application is based upon and claims the benefit of priority from Japanese Patent Application No. 2021-014487, filed on Feb. 1, 2021, the entire contents of which are incorporated herein by reference.

FIELD

Embodiments described herein relate generally to a communication apparatus and a communication method.

BACKGROUND

If a wireless tag is at a position where communication ranges of a plurality of readers having the same transmission frequency band overlap each other, it is not possible to identify which of transmitted signals from the plurality of readers a reflected wave from the wireless tag is related.

In order to solve this problem, it is conceivable to devise data transmission on the wireless tag side so that the reader can identify a reader to which data is transmitted. However, in this method, a function required for the wireless tag advances, and a configuration of the wireless tag becomes complicated.

Therefore, it is desired that transmitted data from a wireless tag that is directed to another reader can be prevented from being erroneously received without making a configuration of the wireless tag complicated.

DETAILED DESCRIPTION

An aspect of the exemplary embodiments is to provide a communication apparatus and a communication method in which transmitted data from a wireless tag that is directed to another reader can be prevented from being erroneously received without making a configuration of the wireless tag complicated.

In general, according to one embodiment, a communication apparatus includes a quadrature modulation unit, a transmission unit, a reception unit, a quadrature detection unit, a first demodulation unit, a first decoding unit, a second demodulation unit, a second decoding unit, a generation unit, a comparison unit, and a processing unit. The quadrature modulation unit is configured to output a modulated wave obtained by performing quadrature modulation on a carrier wave using a first I signal and a first Q signal. The transmission unit is configured to wirelessly transmit the modulated signal output from the quadrature modulation unit. The reception unit is configured to receive a wireless signal obtained if the transmitted wave from the transmission unit is backscattered by the wireless tag and undergoes amplitude shift keying and configured to output a received signal. The quadrature detection unit is configured to detect the received signal output from the reception unit using the carrier wave and to output a second I signal and a second Q signal. The first demodulation unit is configured to detect at least one of the second I signal and the second Q signal output from the quadrature detection unit and to demodulate first data that undergoes amplitude shift keying and is transmitted from the wireless tag. The first decoding unit is configured to decode the first data demodulated by the first demodulation unit. The second demodulation unit is configured to detect the second I signal and the second Q signal output from the quadrature detection unit and to demodulate second data that undergoes frequency shift keying. The second decoding unit is configured to decode the second data demodulated by the second demodulation unit. The generation unit is configured to generate the first I signal and the first Q signal as signals that allow the carrier wave to undergo frequency shift keying with predetermined modulated data and to input the first I signal and the first Q signal to the quadrature modulation unit. The comparison unit is configured to compare the second data decoded by the second decoding unit and the modulated data to each other. The processing unit is configured to execute, when match between the second data decoded by the second decoding unit and the modulated data is confirmed by the comparison unit, data processing on the first data decoded by the second decoding unit.

Hereinafter, an example of an embodiment will be described using the drawings.

Figure 1:
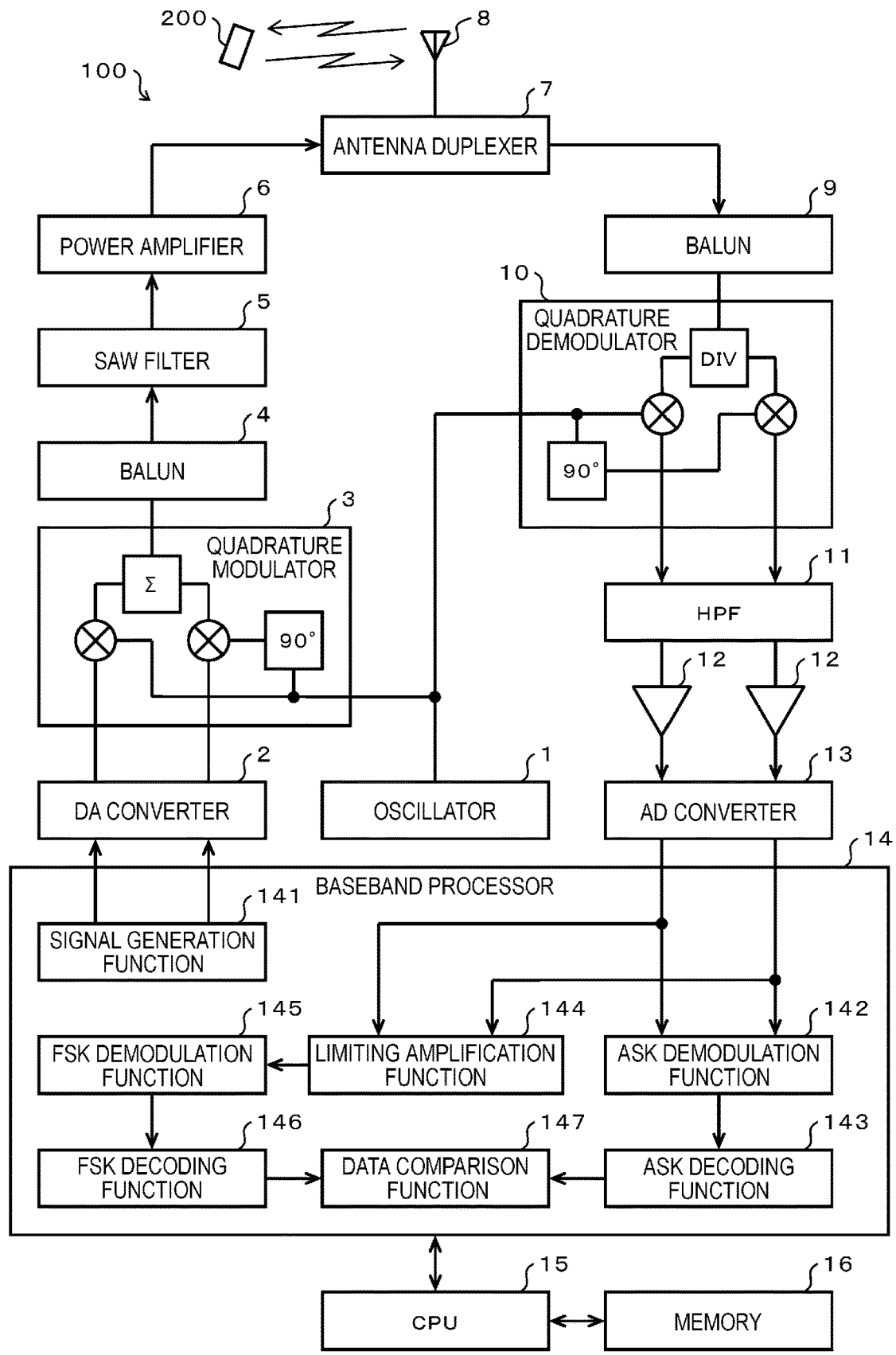
FIG. 1 is a block diagram illustrating a main circuit configuration of a reading apparatus according to an embodiment.

FIG. 1 is a block diagram illustrating a main circuit configuration of a reading apparatus 100 according to the embodiment.

The reading apparatus 100 reads data stored in a radio frequency identification (RFID) tag 200 from the RFID tag 200 by backscatter communication. That is, the reading apparatus 100 has functions as a communication apparatus that wirelessly communicates with the RFID tag 200 if the data is read from the RFID tag 200.

The reading apparatus 100 includes an oscillator 1, a digital to analog (DA) converter 2, a quadrature modulator 3, a balun 4, a surface acoustic wave (SAW) filter 5, a power amplifier 6, an antenna duplexer 7, an antenna 8, a balun 9, a quadrature detector 10, a high pass filter (HPF) 11, two variable gain amplifiers (VGAs) 12, an analog to digital (AD) converter 13, a baseband processor 14, a central processing unit (CPU) 15, and a memory 16.

The oscillator 1 generates a sine wave of a predetermined frequency $f_{local}$ as a carrier wave.

The DA converter 2 converts each of two-system signals (hereinafter referred to as "transmitted I signal" and "transmitted Q signal") output from the baseband processor 14 in a digital format into an analog signal.

The transmitted I signal and the transmitted Q signal as the analog signals converted by the DA converter 2 are input to the quadrature modulator 3 as a modulated wave. The carrier wave generated by the oscillator 1 and a carrier wave obtained by shifting a phase of the carrier wave by 90° are input to the quadrature modulator 3 as an I-system carrier wave and a Q-system carrier wave, respectively. The quadrature modulator 3 obtains a transmitted signal by quadrature modulation. In the embodiment, as the quadrature modulator 3, a device having a well-known configuration including a phase shifter, two mixers, and an adder is used. However, another well-known device having a different configuration may be used. For example, the quadrature modulator 3 may not include a phase shifter, and a carrier wave obtained by shifting a phase of the carrier wave output from the oscillator 1 by 90° with a phase shifter provided outside the quadrature modulator 3 may be input to the quadrature modulator 3 separately from the carrier wave output from the oscillator 1. The transmitted I signal and the transmitted Q signal correspond to the first I signal and the first Q signal, and the quadrature modulator 3 is an example of the modulation unit.

The balun 4 converts a balanced signal output from the quadrature modulator 3 into an unbalanced signal.

The SAW filter 5 removes a low-frequency component and a high-frequency component from the transmitted signal output from the balun 4 in order to limit unwanted emission.

The power amplifier 6 amplifies the transmitted signal transmitted through the SAW filter 5 up to a level suitable for wireless transmission.

The antenna duplexer 7 supplies the transmitted signal output from the power amplifier 6 to the antenna 8. The antenna duplexer 7 outputs the received signal received by the antenna 8 to the balun 9.

The antenna 8 emits a radio wave corresponding to the transmitted signal supplied through the antenna duplexer 7. The antenna 8 receives the arrived radio wave. That is, if reflected wave from the RFID tag 200 arrives at the antenna 8, the antenna 8 receives a signal corresponding to the reflected wave.

As described above, the transmitted signal is wirelessly transmitted by the SAW filter 5, the power amplifier 6, and the antenna 8. That is, the SAW filter 5, the power amplifier 6, and the antenna 8 configure a transmission unit that wirelessly transmits modulated wave output from the quadrature modulator 3 as a modulation unit. In addition, the antenna functions as a reception unit that receives a signal corresponding to reflected wave as an amplitude shift keying (ASK) wave transmitted from the RFID tag 200 as a wireless tag using a backscattering method.

The balun 9 converts the unbalanced signal input through the antenna duplexer 7 into a balanced signal.

The quadrature detector 10 detects the received signal output from the balun 9 by quadrature detection using the carrier wave generated by the oscillator 1 and the carrier wave obtained by shifting a phase of the carrier wave by 90°. The quadrature detector 10 outputs the two-system signals (hereinafter referred to as "received I signal" and "received Q signal") obtained by the quadrature detection in parallel. In the embodiment, as the quadrature detector 10, a device having a well-known configuration including a distributor, a phase shifter, and two mixers is used. However, another well-known device having a different configuration may be used. For example, the quadrature detector 10 may not include a phase shifter, and a carrier wave obtained by shifting a phase of the carrier wave output from the oscillator 1 by 90° with a phase shifter provided outside the quadrature modulator 3 may be input to the quadrature detector 10 separately from the carrier wave output from the oscillator 1. The quadrature detector 10 is an example of the quadrature detection unit, and the received I signal and the received Q signal correspond to the second I signal and the second Q signal.

The HPF 11 allows transmission of a frequency component higher than a predetermined cutoff frequency $f_{cut}$ in each of the received I signal and the received Q signal output from the quadrature detector 10. The HPF 11 includes, for example, two direct current (DC) cut capacitors corresponding to the received I signal and the received Q signal. The HPF 11 corresponds to the filter unit.

The two VGAs 12 amplify the received I signal and the received Q signal transmitted through the HPF 11 up to levels suitable for detection and data decoding described below. The two VGAs configure the amplification unit.

The AD converter 13 converts each of the received I signal and the received Q signal amplified by the VGAs 12 into a digital signal.

The baseband processor 14 executes information processing for signal processing relating to a baseband signal. The baseband processor 14 includes, as functions implemented by executing the information processing, a signal generation function 141, an ASK demodulation function 142, an ASK decoding function 143, a limiting amplification function 144, an FSK demodulation function 145, an FSK decoding function 146, and a data comparison function 147. The signal generation function 141 is instructed by the CPU 15 to generate the transmitted I signal and the transmitted Q signal for allowing the quadrature modulator 3 to perform frequency shift keying (FSK) with predetermined modulated data (hereinafter, referred to as "FSK modulated data") and to input the transmitted I signal and the transmitted Q signal to the DA converter 2 in parallel. The ASK demodulation function 142 obtains an ASK demodulated signal obtained by demodulating an ASK modulated signal in the received signal input to the quadrature detector 10 based on the received I signal and the received Q signal output from the AD converter 13. The ASK decoding function 143 decodes the ASK demodulated signal and obtains data transmitted from the RFID tag 200. The limiting amplification function 144 amplifies each of the received I signal and the received Q signal output from the AD converter 13 by limiting amplification. The FSK demodulation function 145 obtains an FSK demodulated signal obtained by demodulating an FSK modulated signal in the received signal input to the quadrature detector 10 based on the received I signal and the received Q signal amplified by the limiting amplification function 144. The FSK decoding function 146 decodes the FSK demodulated signal and obtains FSK decoded data. If the FSK decoded data obtained by the FSK demodulation function 145 matches the FSK modulated data, the data comparison function 147 outputs data decoded by the ASK decoding function 143 to the CPU 15 as valid received data. The data decoded by the ASK decoding function 143 corresponds to the first data, and the FSK decoded data corresponds to the second data.

Thus, the baseband processor 14 functions as the generation unit by the signal generation function 141, functions as the first demodulation unit by the ASK demodulation function 142, functions as the first decoding unit by the ASK decoding function 143, functions as the amplification unit by the limiting amplification function 144, functions as the second demodulation unit by the FSK demodulation function 145, functions as the second decoding unit by the FSK decoding function 146, and functions as the comparison unit by the data comparison function 147.

The CPU 15 controls the baseband processor 14 to output the transmitted I signal and the transmitted Q signal in accordance with a predetermined sequence during communication with the RFID tag 200. The CPU 15 executes predetermined data processing on data decoded by the baseband processor 14. That is, when match between the FSK modulated data and the FSK decoded data is confirmed by the data comparison function 147, the CPU 15 executes data processing on the data decoded by the ASK decoding function, and the CPU 15 is an example of the processing unit.

The memory 16 stores an information processing program describing the information processing executed by the CPU 15. The memory 16 stores various types of data required for the CPU 15 to execute various types of information processing. The memory 16 stores various types of data generated or acquired if the CPU 15 executes various types of information processing.

Next, an operation of the reading apparatus 100 configured as described above will be described.

The operation of the reading apparatus 100 is different from that of a well-known reading apparatus in an operation regarding a period in which data is received from the RFID tag 200 regarding communication with the RFID tag 200. Hereinafter, this operation will be described in detail, and description of other well-known operations will not be made.

At a timing at which data reading from the RFID tag 200 should start, the CPU 15 instructs the baseband processor 14 to start reading the data. In accordance with the instruction, the baseband processor 14 starts generating and outputting the transmitted I signal and the transmitted Q signal by the signal generation function 141 such that the transmitted signal output from the quadrature modulator 3 is a desired modulated wave.

The baseband processor 14 generates the transmitted I signal and the transmitted Q signal such that a transmitted signal is output from the quadrature modulator 3, the transmitted signal being obtained by performing FSK on the carrier wave having the frequency $f_{local}$ output from the oscillator 1 with the FSK modulated data as the predetermined modulated data. Specifically, the baseband processor 14 generates the transmitted I signal and the transmitted Q signal such that a signal in which a unit period having a frequency of $f_{local}+f_{dev}$ and a unit period having a frequency of $f_{local}-f_{dev}$ are generated in a pattern based on the FSK modulated data is generated as a transmitted signal. The baseband processor 14 sets, for example, both of the frequencies of the transmitted I signal and the transmitted Q signal to $f_{dev}$. By making a phase difference between the transmitted I signal and the transmitted Q signal different, the frequency of the carrier wave is shifted by $+f_{dev}$ or $-f_{dev}$. The frequency $f_{dev}$ may be freely determined by, for example, a designer of the reading apparatus 100. In this case, the frequency $f_{dev}$ is higher than the frequency $f_{cut}$.

The FSK modulated data may be freely determined by, for example, a designer of the reading apparatus 100. In the embodiment, the FSK modulated data is data in which "10110101" is repeated, the data "1" is modulated such that the frequency of the unit period is $f_{local}+f_{dev}$, and the data "0" is modulated such that the frequency of the unit period is $f_{local}-f_{dev}$. Regarding a plurality of reading apparatuses 100, if there is a possibility that communication ranges thereof overlap each other and one RFID tag 200 is positioned in the overlapping range, the FSK modulated data is determined to vary depending on the plurality of reading apparatuses 100. Accordingly, the FSK modulated data is identification data for identifying the reading apparatus 100 that transmits the transmitted signal.

Figure 2:
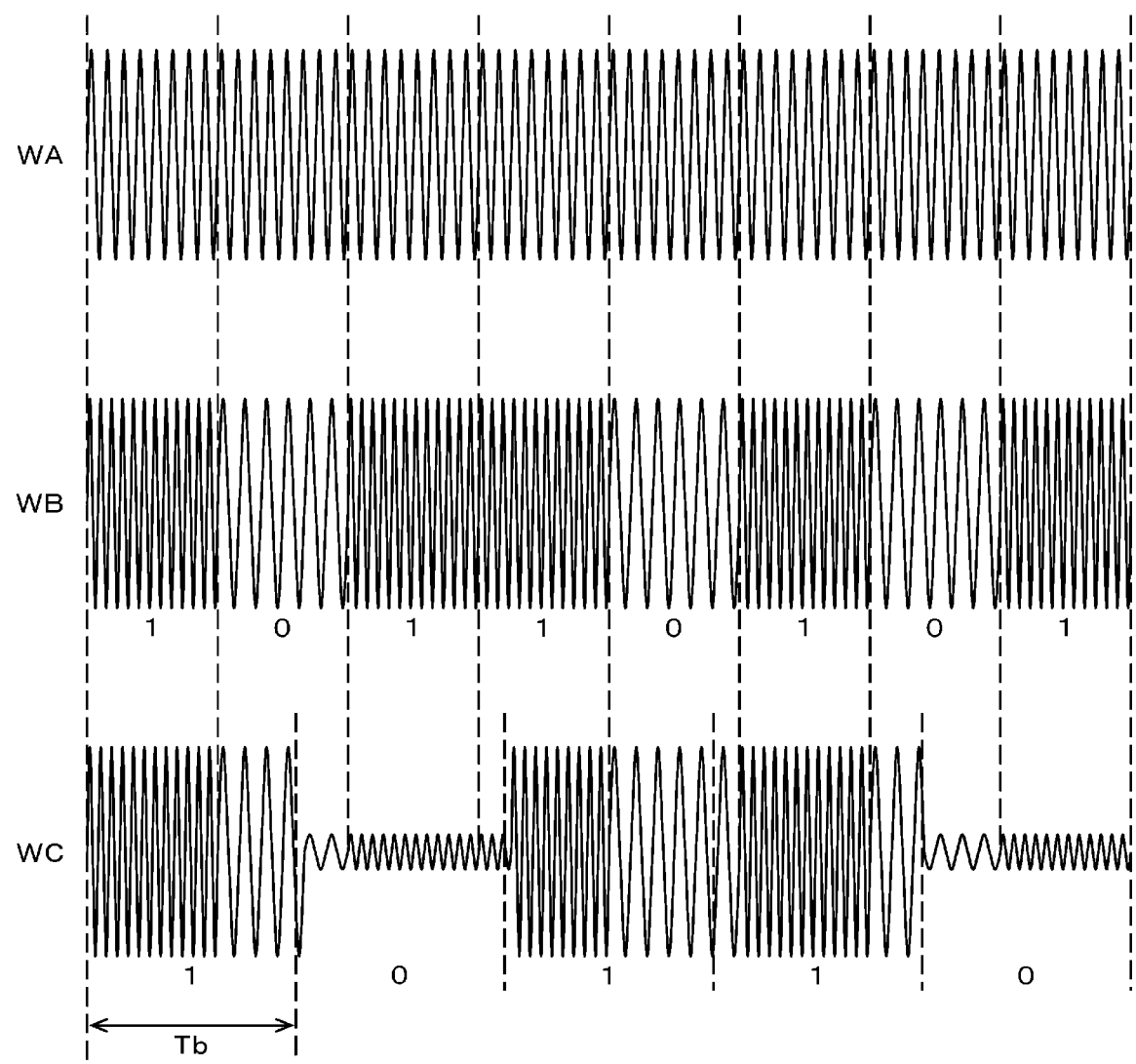
FIG. 2 is a diagram illustrating waveforms of various signals relating to transmission and reception of the reading apparatus illustrated in FIG. 1.

FIG. 2 is a diagram illustrating waveforms of various signals relating to transmission and reception of the reading apparatus 100.

A waveform WA is a waveform of the carrier wave output from the oscillator 1. A waveform WB is a waveform of a signal obtained by performing FSK with the identification data. A waveform WC is a waveform of the reflected wave from the RFID tag 200. In this case, FIG. 2 illustrates an image representing an increase or decrease in frequency in each of the signals, in which a relationship between the frequency of the waveforms WA and the frequencies of the waveforms WB and WC does not appropriately represent an actual relationship between the frequencies.

If the RFID tag 200 receives the transmitted signal from the reading apparatus 100, the reflectivity thereof changes depending on data (hereinafter, referred to as "tag data") to be read by the reading apparatus 100. As a result, the reflected wave from the RFID tag 200 is the signal obtained by performing ASK on the transmitted signal from the reading apparatus 100 with the tag data. That is, if the transmitted signal has the waveform WB, the reflected wave has the waveform WC. One bit period in the reflected wave from the RFID tag 200 is represented by Tb, and a relationship of $f_{dev}>1/Tb$ is satisfied. If the transmission bit rate of the RFID tag 200 is slow, $f_{cut}>1/Tb$ is satisfied, and a relationship of $f_{dev}>f_{cut}>1/Tb$ is satisfied.

Figure 3:
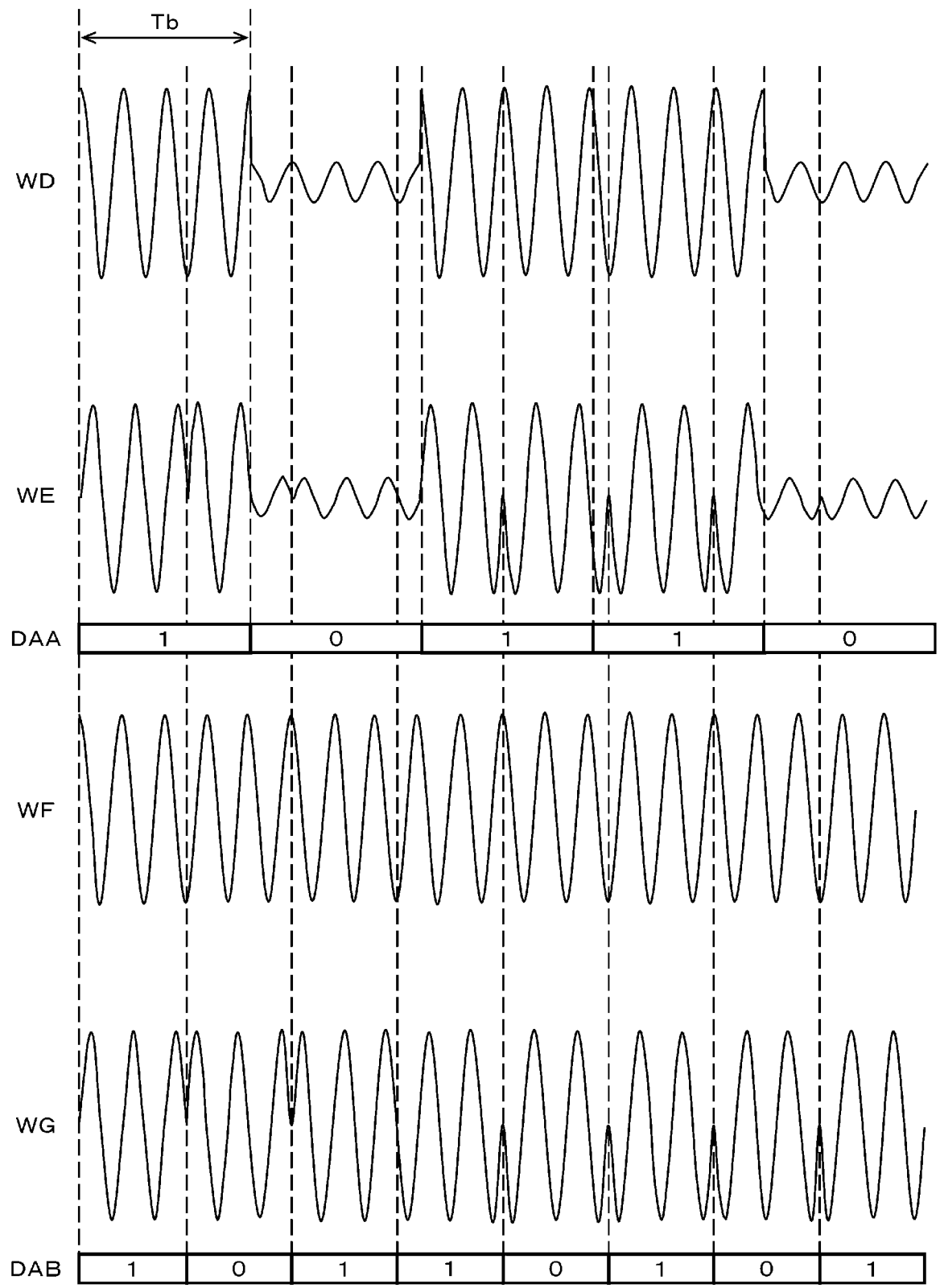
FIG. 3 is a diagram illustrating a reception process of tag data in the reading apparatus illustrated in FIG. 1.

FIG. 3 is a diagram illustrating a reception process of the tag data in the reading apparatus 100.

If the received signal having the waveform WC illustrated in FIG. 2 is detected by the quadrature detector 10 by quadrature detection, the received I signal having a waveform WD and the received Q signal having a waveform WE illustrated in FIG. 3 are obtained.

The frequencies of the received I signal and the received Q signal are $f_{dev}$ and are higher than the cutoff frequency $f_{cut}$ in the HPF 11. Therefore, the received I signal and the received Q signal transmit through the HPF 11.

In the baseband processor 14, if the received I signal and the received Q signal as digital signals that are transmitted through the HPF 11, are amplified by the VGAs 12, and are converted by the AD converter 13 are input, the received I signal and the received Q signal are detected by the ASK demodulation function 142 and are demodulated. As a result, a baseband signal corresponding to the tag data from which the component of the frequency $f_{dev}$ is removed is obtained. The baseband processor 14 decodes tag data DAA based on the demodulation result by the ASK decoding function 143. The processing for decoding may be performed, for example, using the same method as that of another existing reading apparatus.

In the baseband processor 14, if the received I signal and the received Q signal as digital signals that are converted by the AD converter 13 are input, the received I signal and the received Q signal are amplified by the limiting amplification function 144. That is, in the baseband processor 14, a variation in amplitude generated by ASK modulation in the received I signal and the received Q signal is removed, and in order to make the amplitude uniform, each of the received I signal and the received Q signal is amplified while limiting the maximum value of the amplitude.

The waveforms WF and WG in FIG. 2 represent waveforms of signals obtained by amplifying the received I signal and the received Q signal having the waveforms WD and WE by limiting amplification.

There is a phase difference corresponding to the frequency of the reflected wave from the RFID tag 200 between the received I signal and the received Q signal that are amplified by limiting amplification. By detecting the received I signal and the received Q signal and demodulating the received I signal and the received Q signal as FSK modulated I signal and Q signal by the FSK demodulation function 145, a FSK modulated baseband waveform is obtained. By decoding this FSK modulated baseband waveform by the FSK decoding function, identification data DAB included in the reflected wave from the RFID tag 200 by FSK modulation is obtained. If a reflected wave based on a transmitted signal from another reading apparatus not having a function of transmitting a transmitted signal obtained by performing FSK modulation with identification data is received, the baseband processor 14 cannot decode the identification data.

If the identification data DAB decoded by the ASK decoding function 143 matches the identification data corresponding to the transmitted I signal and the transmitted Q signal generated by the signal generation function 141, the baseband processor 14 outputs the tag data DAA decoded by the ASK decoding function 143 to the CPU 15. If the decoded identification data and the transmitted identification data do not match each other or if the identification data cannot be decoded, the baseband processor 14 invalidates and disposes the tag data DAA decoded by the ASK decoding function 143.

In this case, there is a time lag until the RFID tag 200 transmits a reflected wave after the transmitted I signal and the transmitted Q signal start to be output by the signal generation function 141 and the FSK modulated signal by the transmitted data is output as a transmitted signal, and a part of the transmitted data is not included in the reflected wave. The data comparison function 147 does not perform comparison to generated data regarding a part of the identification data transmitted within a given period from the start of transmission.

If tag data is obtained from the baseband processor 14, the CPU 15 executes predetermined data processing on this tag data. This data processing is, for example, processing of adding a commodity code in the tag data to a commodity list. In this case, the details of the data processing may be freely determined by, for example, a designer or a user of the reading apparatus 100.

Thus, the reading apparatus 100 executes data processing on only tag data obtained from the reflected wave from the RFID tag 200 based on the transmitted signal transmitted from the reading apparatus 100. Accordingly, the reading apparatus 100 does not execute data processing on tag data transmitted from RFID tag 200 to another reading apparatus 100. That is, the reading apparatus 100 does not erroneously receive tag data transmitted to another reading apparatus.

In the RFID tag 200, it is not necessary to execute a special process for identifying the reading apparatus to which a signal is transmitted as a response, and complication of the configuration caused by adding a configuration for the special process can be avoided. AS the RFID tag 200, for example, a backscattering type existing device can be applied as it is.

In the reading apparatus 100, FSK modulation and FSK demodulation are implemented in cooperation of the quadrature modulator 3, the quadrature detector 10, and the baseband processor 14. Therefore, by changing the processing in the baseband processor 14, FSK modulation and FSK demodulation can be implemented without changing the hardware configuration.

This embodiment can be modified as follows in various ways.

In the above-described embodiment, the data used for FSK is the data in which the pattern of "1", "0", "1", "1", "0", "1", "0", and "1" is repeated. However, the data used for FSK is not particularly limited. For example, the data used for FSK may be data in which "0" or "1" is randomly generated. For example, a pattern may be predetermined until the reception of the transmitted data of the RFID tag 200 is completed. If data in which "0" or "1" is randomly generated is used, the pattern is notified from the signal generation function 141 to the data comparison function 147. For example, the FSK modulated data generated by the signal generation function 141 may be stored in an internal memory of the baseband processor 14 such that the FSK modulated data is referred to by the data comparison function 147.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus that communicates with a wireless tag, comprising:
    a quadrature modulation component configured to output a modulated wave obtained by performing quadrature modulation on a carrier wave using a first inphase(I) signal and a first quadrature(Q) signal;
    a transmission component configured to wirelessly transmit the modulated wave output from the quadrature modulation component;
    a reception component configured to receive a wireless signal obtained if the transmitted wave from the transmission component is backscattered by the wireless tag and undergoes amplitude shift keying and to output a received signal;
    a quadrature detector configured to detect the received signal output from the reception component using the carrier wave and to output a second I signal and a second Q signal;
    a first demodulation component configured to detect at least one of the second I signal and the second Q signal output from the quadrature detector and to demodulate first data that undergoes amplitude shift keying and transmitted from the wireless tag;
    a first decoding component configured to decode the first data demodulated by the first demodulation component;
    a second demodulation component configured to detect the second I signal and the second Q signal output from the quadrature detector and to demodulate second data that undergoes frequency shift keying;
    a second decoding component configured to decode the second data demodulated by the second demodulation component;
    a generation component configured to generate the first I signal and the first Q signal as signals that allow the carrier wave to undergo frequency shift keying with predetermined modulated data and to input the first I signal and the first Q signal to the quadrature modulation component;
    a comparison component configured to compare the second data decoded by the second decoding component and the modulated data to each other; and
    a processing component configured to execute, when matching between the second data decoded by the second decoding component and the modulated data is confirmed by the comparison component, data processing on the first data decoded by the first decoding component.

2. The communication apparatus according to claim 1, further comprising:

a filter configured to allow transmission of a frequency component higher than a cutoff frequency in the second I signal and the second Q signal output from the quadrature detector; and
an amplifier configured to amplify the second I signal and the second Q signal transmitted through the filter,
wherein the generation component generates the first I signal and the first Q signal such that a frequency shift amount of the frequency shift keying is more than a cutoff frequency.

3. The communication apparatus according to claim 1, wherein the generation component generates the first I signal and the first Q signal such that the modulated data is predetermined data.

4. The communication apparatus according to claim 1, wherein the generation component generates the first I signal and the first Q signal such that the modulated data is random data.

5. The communication apparatus according to claim 1, wherein the wireless tag is a radio frequency identifier wireless tag.

6. The communication apparatus according to claim 2, wherein the filter is a high pass filter.

7. A communication method for communication with a wireless tag, comprising:
outputting a modulated wave obtained by performing quadrature modulation on a carrier wave using a first inphase(I) signal and a first quadrature(Q) signal;
wirelessly transmitting the modulated wave;
receiving a wireless signal obtained if the transmitted wave transmitted by wireless transmission is backscattered by the wireless tag and undergoes amplitude shift keying and outputting a received signal;
detecting the received signal using the carrier wave and outputting a second I signal and a second Q signal;
detecting at least one of the second I signal and the second Q signal and demodulating first data that undergoes amplitude shift keying and transmitted from the wireless tag;
decoding the demodulated first data;
detecting the second I signal and the second Q signal and demodulating second data that undergoes frequency shift keying;
decoding the demodulated second data;
generating the first I signal and the first Q signal that allow the carrier wave to undergo frequency shift keying with predetermined modulated data;
comparing the decoded second data and the modulated data to each other; and
executing, when matching between the decoded second data and the modulated data is confirmed by the comparing, data processing on the decoded first data.

8. The communication method according to claim 7, further comprising:
filtering to allow transmission of a frequency component higher than a cutoff frequency in the second I signal and the second Q signal output;
amplifying the second I signal and the second Q signal transmitted; and
generating the first I signal and the first Q signal such that a frequency shift amount of the frequency shift keying is more than a cutoff frequency.

9. The communication method according to claim 7, further comprising:
generating the first I signal and the first Q signal such that the modulated data is predetermined data.

10. The communication method according to claim 7, further comprising:
generating the first I signal and the first Q signal such that the modulated data is random data.

11. The communication method according to claim 7, wherein the wireless tag is a radio frequency identifier wireless tag.

12. The communication method according to claim 8, wherein filtering uses high pass filtering.

13. A device that communicates with a radio frequency identification wireless tag, comprising:
a quadrature modulation component configured to output a modulated wave obtained by performing quadrature modulation on a carrier wave using a first inphrase(I) signal and a first quadrature(Q) signal;
a transmission component configured to wirelessly transmit the modulated wave output from the quadrature modulation component;
a reception component configured to receive a wireless signal obtained if the transmitted wave from the transmission component is backscattered by the radio frequency identification wireless tag and undergoes amplitude shift keying and to output a received signal;
a quadrature detector configured to detect the received signal output from the reception component using the carrier wave and to output a second I signal and a second Q signal;
a first demodulation component configured to detect at least one of the second I signal and the second Q signal output from the quadrature detector and to demodulate first data that undergoes amplitude shift keying and transmitted from the radio frequency identification wireless tag;
a first decoding component configured to decode the first data demodulated by the first demodulation component;
a second demodulation component configured to detect the second I signal and the second Q signal output from the quadrature detector and to demodulate second data that undergoes frequency shift keying;
a second decoding component configured to decode the second data demodulated by the second demodulation component;
a generation component configured to generate the first I signal and the first Q signal as signals that allow the carrier wave to undergo frequency shift keying with predetermined modulated data and to input the first I signal and the first Q signal to the quadrature modulation component;
a comparison component configured to compare the second data decoded by the second decoding component and the modulated data to each other; and
a processing component configured to execute, when matching between the second data decoded by the second decoding component and the modulated data is confirmed by the comparison component, data processing on the first data decoded by the first decoding component.

14. The device according to claim 13, further comprising:
a filter configured to allow transmission of a frequency component higher than a cutoff frequency in the second I signal and the second Q signal output from the quadrature detector; and
an amplifier configured to amplify the second I signal and the second Q signal transmitted through the filter, wherein the generation component generates the first I signal and the first Q signal such that a frequency shift amount of the frequency shift keying is more than a cutoff frequency.

15. The device according to claim 13, wherein the generation component generates the first I signal and the first Q signal such that the modulated data is predetermined data.

16. The device according to claim 13, wherein the generation component generates the first I signal and the first Q signal such that the modulated data is random data.

17. The device according to claim 14, wherein the filter is a high pass filter.

* * * * *